US012592261B2

(12) United States Patent
Jia et al.

(10) Patent No.: US 12,592,261 B2
(45) Date of Patent: Mar. 31, 2026

(54) VIDEO EDITING METHOD AND APPARATUS, AND DEVICE AND STORAGE MEDIUM

(71) Applicant: Beijing Zitiao Network Technology Co., Ltd., Haidian District (CN)

(72) Inventors: Song Jia, Beijing (CN); Yingzhi Zhou, Beijing (CN); Ran Cui, Beijing (CN); Ying Zhang, Beijing (CN); Liangzhao Cao, Beijing (CN); Yuyang Lin, Beijing (CN); Tianqi Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/528,425

(22) Filed: Dec. 4, 2023

(65) Prior Publication Data

US 2024/0105232 A1 Mar. 28, 2024

Related U.S. Application Data

(63) Continuation of application No. PCT/CN2022/097058, filed on Jun. 6, 2022.

(30) Foreign Application Priority Data

Jun. 4, 2021 (CN) .......................... 202110624617.0

(51) Int. Cl.
*G11B 27/031* (2006.01)
*G06F 16/735* (2019.01)

(52) U.S. Cl.
CPC .......... *G11B 27/031* (2013.01); *G06F 16/735* (2019.01)

(58) Field of Classification Search
CPC ..... G11B 27/031; G11B 27/34; G06F 16/735; H04N 5/265; H04N 5/272; H04N 21/854; H04N 23/631; H04N 5/262
(Continued)

(56) References Cited

U.S. PATENT DOCUMENTS 6,445,874 B1 9/2002 Catlow
6,954,894 B1* 10/2005 Balnaves ............. G11B 27/034
715/202
(Continued)

FOREIGN PATENT DOCUMENTS

CN 103838357 A 6/2014
CN 108062760 A 5/2018
(Continued)

OTHER PUBLICATIONS

English Translation of Chinese Publication CN 110139159 (Year: 2019).*
(Continued)

*Primary Examiner* — Loi H Tran
(74) *Attorney, Agent, or Firm* — Alleman Hall LLP

(57) ABSTRACT

A video editing method and apparatus, a computer readable storage medium, a device, and a computer program product are provided. The method includes: displaying a material addition page, in response to a preset edition operation for a first video editing template; acquiring a user material corresponding to the first video editing template, based on the material addition page; and generating a first video corresponding to the first video editing template according to the user material. The material description information corresponding to the first video editing template is displayed on the material addition page, and the material description information is used to describe a content feature of a user material. The first video is a video edited from the user (Continued)

Displaying a material addition page, in response to a preset edition operation for a first video editing template — S101

Acquiring the user material corresponding to the first video editing template, based on the material addition page — S102

Generating a first video corresponding to the first video editing template based on the user material — S103 material according to an editing operation indicated by the first video editing template.

17 Claims, 8 Drawing Sheets

(58) Field of Classification Search
USPC .......................................................... 386/278
See application file for complete search history.

(56) References Cited

U.S. PATENT DOCUMENTS

| | | | |
|---|---|---|---|
| 11,856,286 B2 * | 12/2023 | Li ........................... H04N 23/45 | |
| 2011/0255845 A1 | 10/2011 | Kikuchi | |
| 2020/0293784 A1 | 9/2020 | Zhou | |
| 2022/0188352 A1 * | 6/2022 | Wu ........................ G06F 16/739 | |
| 2023/0353844 A1 | 11/2023 | Li et al. | |

FOREIGN PATENT DOCUMENTS

| | | | | | |
|---|---|---|---|---|---|
| CN | 110139159 A | * | 8/2019 | ........... | G11B 27/031 |
| CN | 110198486 A | | 9/2019 | | |
| CN | 110855904 A | | 2/2020 | | |
| CN | 110933472 A | | 3/2020 | | |
| CN | 110996017 A | | 4/2020 | | |
| CN | 111243632 A | | 6/2020 | | |
| CN | 111357277 A | | 6/2020 | | |
| CN | 112632326 A | | 4/2021 | | |
| CN | 112866796 A | | 5/2021 | | |
| CN | 112887584 A | | 6/2021 | | |
| CN | 113891017 A | | 1/2022 | | |
| JP | 2005236938 B2 | | 9/2005 | | |
| JP | 2007318450 A | | 12/2007 | | |
| JP | 2008177955 A | | 7/2008 | | |
| JP | 2009527135 A | | 7/2009 | | |
| JP | 2020113842 A | | 7/2020 | | |
| JP | 2021513699 A | | 5/2021 | | |
| WO | 2021042605 A1 | | 3/2021 | | |
| WO | WO-2022126664 A1 | * | 6/2022 | | |

OTHER PUBLICATIONS

English Translation of Chinese Publication CN 112422831 (Year: 2021).*

English Translation of WIPO Publication WO 2022126664 for PCT CN2020137795 Filing Date Dec. 18, 2020 (Year: 2022).*

Notice of Reasons for Refusal for Japanese Application No. 2023-574741, mailed Feb. 25, 2025, 21 pages.

Japan Patent Office, Notice of Allowance Issued in Application No. 2023574741, Aug. 5, 2025, 5 pages.

European Patent Office, Communication Pursuant to Rules 70(2) and 70a(2) EPC for European Application No. 22815388.8, mailed Oct. 15, 2024, 1 page.

European Patent Office, Extended European Search Report for European Application No. 22815388.8, mailed Sep. 27, 2024, 10 pages.

* cited by examiner

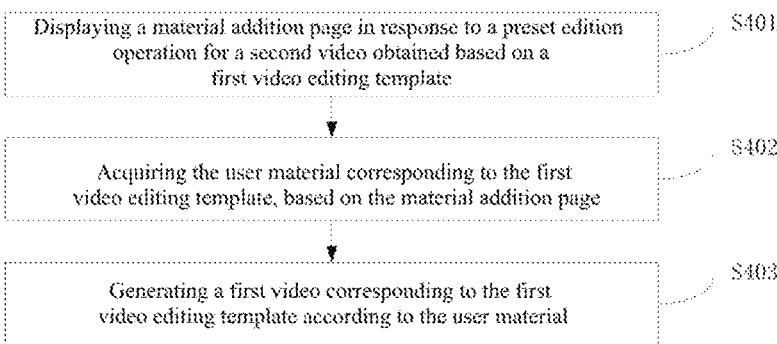

Displaying a material addition page in response to a preset edition operation for a second video obtained based on a first video editing template    S401

Acquiring the user material corresponding to the first video editing template, based on the material addition page    S402

Generating a first video corresponding to the first video editing template according to the user material    S403

FIG. 4

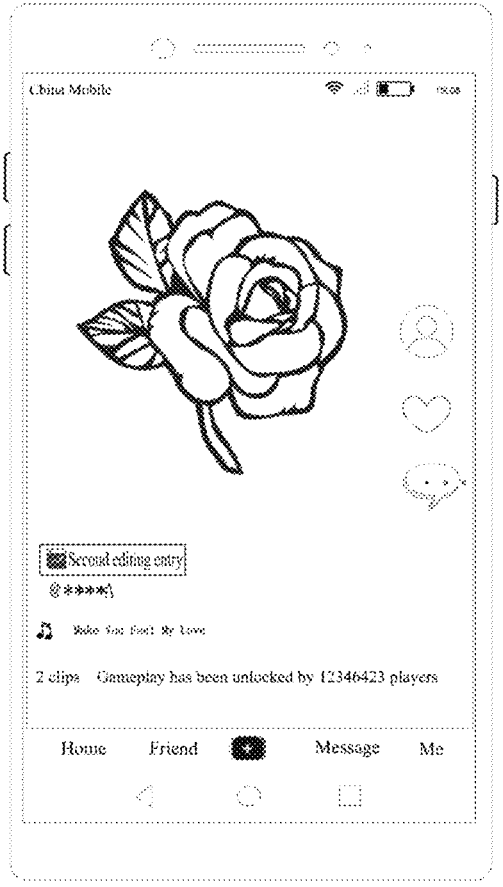

China Mobile

Second editing entry

@ ****\

Make You Feel My Love 2 clips    Gameplay has been unlocked by 12346423 players

Home    Friend    Message    Me

FIG. 5

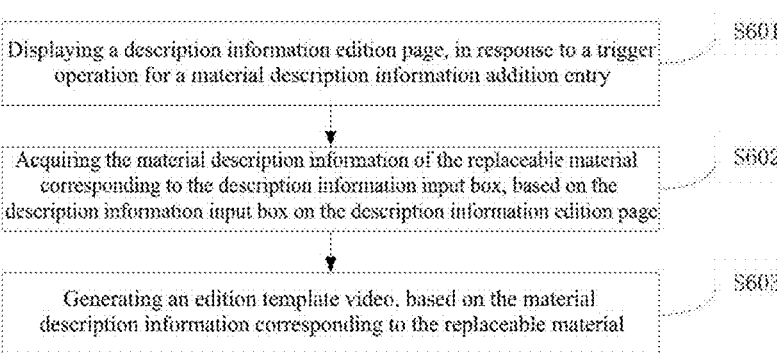

| | |
|---|---|
| Displaying a description information edition page, in response to a trigger operation for a material description information addition entry | S601 |
| Acquiring the material description information of the replaceable material corresponding to the description information input box, based on the description information input box on the description information edition page | S602 |
| Generating an edition template video, based on the material description information corresponding to the replaceable material | S603 |

FIG. 6

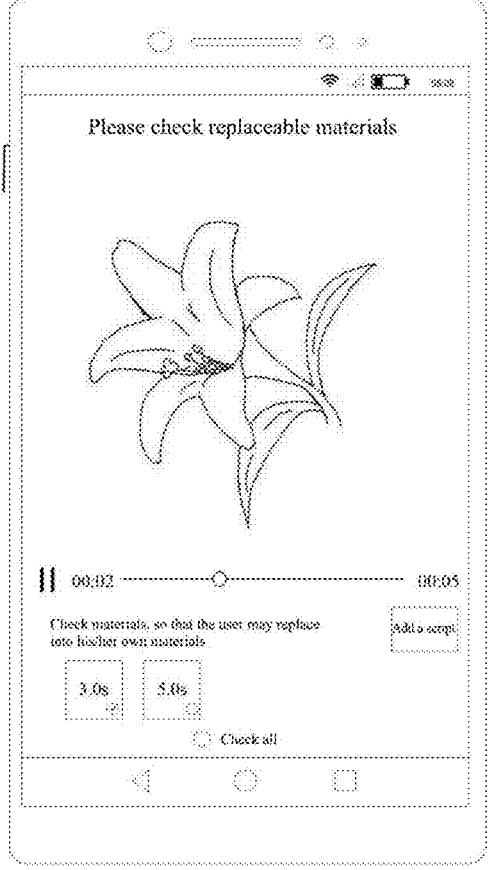

FIG. 7

Clip content

00:03 — 00:05

Input guide text

First displaying module — 1001

First acquiring module — 1002

First generating module — 1003

1

VIDEO EDITING METHOD AND APPARATUS, AND DEVICE AND STORAGE MEDIUM

CROSS REFERENCE TO RELATED APPLICATION

This application is a continuation of International Patent Application No. PCT/CN2022/097058, filed on Jun. 6, 2022, which claims the priority to and benefits of Chinese Patent Application No. 202110624617.0, filed on Jun. 4, 2021. All the aforementioned patent applications are hereby incorporated by reference in their entireties.

TECHNICAL FIELD

The present disclosure relates to a field of data processing, and more particularly, to a video editing method, apparatus and device, and a storage medium.

BACKGROUND

With continuous development of video processing technology, people's requirements for video editing modes are increasing. Therefore, how to enrich the video editing modes to meet the growing demand of users for video editing and improve user experience is currently an urgent technical problem to be solved.

SUMMARY

In order to solve the above-described technical problems or at least partially solve the above-described technical problems, the present disclosure provides a video editing method, in which material description information in a first video editing template may be utilized to indicate acquisition of a user material, and then a first video is generated based on the acquired user material, which enriches the video editing modes and improves user experience.

In a first aspect, the present disclosure provides a video editing method, comprising:

displaying a material addition page, in response to a preset edition operation for a first video editing template, wherein material description information corresponding to the first video editing template is displayed on the material addition page, and the material description information is configured to describe a content feature of a user material;

acquiring a user material corresponding to the first video editing template, based on the material addition page; and generating a first video corresponding to the first video editing template according to the user material, wherein the first video is a video edited from the user material according to an editing operation indicated by the first video editing template.

In an embodiment, the displaying a material addition page, in response to a preset edition operation for a first video editing template, comprises:

displaying the material addition page, in response to a preset edition operation for a second video obtained based on the first video editing template, wherein the first video editing template is configured to indicate that the material to be edited is edited into the second video according to the editing operation indicated by the first video editing template.

2

In an embodiment, a first editing entry is set on the material addition page, and before the acquiring a user material corresponding to the first video editing template, based on the material addition page, the method further comprises:

displaying a description information page, in response to a trigger operation for the first editing entry, wherein the material description information and a material addition entry corresponding to the first video editing template are displayed on the description information page; and jumping from the description information page to the material addition page, in response to a trigger operation for the material addition entry on the description information page.

In an embodiment, a video generating control is set on the description information page, and the generating a first video corresponding to the first video editing template according to the user material, comprises:

editing the user material into the first video according to the editing operation indicated by the first video editing template, in response to a trigger operation for the video generating control on the description information page.

In an embodiment, before the displaying the material addition page, in response to a preset edition operation for a second video obtained based on the first video editing template, the method further comprises:

displaying a second editing entry on a playing page of the second video in a case where the material description information is detected in the second video obtained based on the first video editing template, wherein the second video is sourced from a recommended video stream, and the second editing entry is configured to trigger entry into the description information page.

In an embodiment, before the acquiring a user material corresponding to the first video editing template, based on the material addition page, the method further comprises:

pulling up and displaying the description information page in a preset direction on the material addition page, wherein a material addition entry is set on the description information page; and jumping from the description information page to the material addition page, in response to a trigger operation for the material addition entry on the description information page.

In an embodiment, the method further comprises:

displaying a description information edition page, in response to a trigger operation for a material description information addition entry wherein a cover of a replaceable material and a description information input box corresponding to the replaceable material are displayed on the material description edition page;

acquiring material description information of the replaceable material corresponding to the description information input box, based on the description information input box on the description information edition page; and generating an edition template video, based on the material description information corresponding to the replaceable material.

In an embodiment, before the generating an edition template video, based on the material description information corresponding to the replaceable material, the method further comprises:

playing a replaceable material corresponding to a target cover on a material preview page, and displaying the description information input box of the replaceable material corresponding to the target cover on the material preview page, in response to a trigger operation for the target cover in the cover of the replaceable material displayed on the description information edition page; and acquiring the material description information of the replaceable material corresponding to the target cover, based on the description information input box on the material preview page.

In an embodiment, the method further comprising:

synchronizing the material description information as material description information of a replaceable material having a same editing indication identifier as the replaceable material, after acquiring material description information of any replaceable material.

In an embodiment, the material description information corresponding to the first video editing template has a corresponding relationship with a video clip corresponding to the first video editing template, and the acquiring a user material corresponding to the first video editing template, based on the material addition page, comprises:

acquiring user materials respectively corresponding to one or more video clips in the video clip corresponding to the first video editing template, based on the material addition page.

In an embodiment, the generating a first video corresponding to the first video editing template according to the user material, comprises:

editing a user material having a corresponding relationship with the video clip, according to an editing operation indicated by the video clip corresponding to the first video editing template; and synthesizing edited user materials according to a sequential order of respective video clips, to obtain the first video.

In an embodiment, after the acquiring a user material corresponding to the first video editing template, based on the material addition page, the method further comprises:

jumping to the description information page, and updating and displaying an acquired user material on the description information page, in response to the trigger operation.

In a second aspect, the present disclosure provides a video editing apparatus, comprising:

a first displaying module, configured to display a material addition page, in response to a preset edition operation for a first video editing template, wherein material description information corresponding to the first video editing template is displayed on the material addition page, and the material description information is configured to describe a content feature of a user material;

a first acquiring module, configured to acquire a user material corresponding to the first video editing template, based on the material addition page; and a first generating module, configured to generate a first video corresponding to the first video editing template according to the user material, wherein the first video is a video edited from the user material according to an editing operation indicated by the first video editing template.

In a third aspect, the present disclosure provides a computer readable storage medium, on which instructions are stored, wherein the instructions, when running on a terminal device, cause the terminal device to implement any of the methods described above.

In a fourth aspect, the present disclosure provides a device, comprising a memory, a processor, and a computer program stored on the memory and capable of running on the processor, wherein the processor, when executing the computer program, implements any of the methods described above.

In a fifth aspect, the present disclosure provides a computer program product, comprising a computer program/instruction, wherein the computer program/instruction, when executed by a processor, implements any of the methods described above.

The technical solution provided by the embodiments of the present disclosure has advantages below as compared with the prior art:

The embodiments of the present disclosure provide a video editing method; firstly, the material addition page is displayed, in response to the preset edition operation for the first video editing template; the material description information corresponding to the first video editing template is displayed on the material addition page, and the material description information is used to describe the content feature of the user material. Then, based on the material addition page, the user material corresponding to the first video editing template is acquired; further, the first video is generated according to the acquired user material; and the first video is a video edited from the acquired user material according to the editing operation indicated by the first video editing template. It may be seen that the embodiments of the present disclosure may utilize the material description information in the first video editing template to indicate acquisition of the user material, and then the first video is generated based on the acquired user material, which enriches the video editing modes and improves user experience.

BRIEF DESCRIPTION OF THE DRAWINGS

The accompanying drawings here are incorporated into the specification and form a part of this specification, showing embodiments that comply with the present disclosure, and are used together with the specification to explain the principles of the present disclosure.

In order to clearly illustrate the technical solution of the embodiments of the present disclosure or in the prior art, the drawings that need to be used in description of the embodiments or the prior art will be briefly described in the following; it is obvious that based on the drawings, those ordinarily skilled in the art can acquire other drawings, without any inventive work.

FIG. 4 is a flow chart of another video editing method provided by an embodiment of the present disclosure;

FIG. 5 is a schematic diagram of a playing page of a second video provided by an embodiment of the present disclosure;

FIG. 6 is a flow chart of another video editing method provided by an embodiment of the present disclosure;

FIG. 7 is a schematic diagram of a playing page of a video to be edited provided by an embodiment of the present disclosure;

DETAILED DESCRIPTION

In order to better understand the above-described objectives, features, and advantages of the present disclosure, the solution of the present disclosure will be further described below. It should be noted that in case of no conflict, the embodiments of the present disclosure and the features in the embodiments may be combined with each other.

Many specific details have been elaborated in the following description to facilitate full understanding of the present disclosure, but the present disclosure may also be implemented in other ways different from those described here; obviously, the embodiments in the specification are only some of the embodiments of the present disclosure, rather than all of them.

In order to enrich video editing modes and improve user experience, the embodiment of the present disclosure provides a video editing method; specifically, a material addition page is firstly displayed in the case where a preset edition operation for a first video editing template is received, wherein material description information corresponding to the first video editing template is displayed on the material addition page and is used for describing a content feature of a user material. Then, based on the material addition page, the user material corresponding to the first video editing template is acquired for generating a first video corresponding to the first video editing template, wherein the first video is a video edited from the acquired user material according to an editing operation indicated by the first video editing template.

Figure 1:
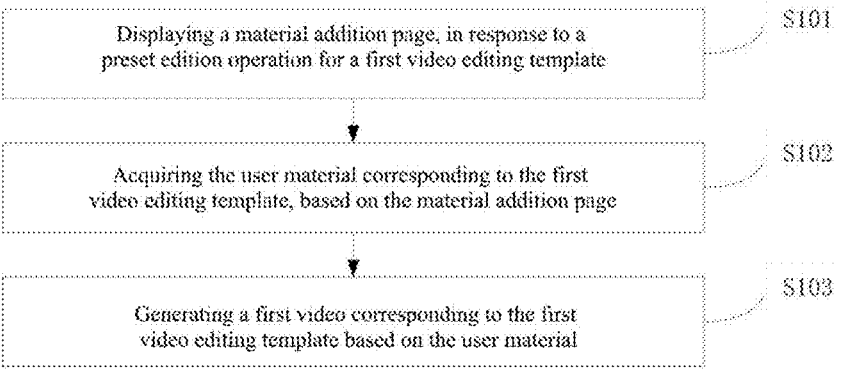
FIG. 1 is a flow chart of a video editing method provided by an embodiment of the present disclosure.

Based on this, an embodiment of the present disclosure provides a video editing method, referring to FIG. 1, which is a flow chart of a video editing method provided by the embodiment of the present disclosure, the method including:

S101: displaying a material addition page, in response to a preset edition operation for a first video editing template.

Wherein material description information corresponding to the first video editing template is displayed on the material addition page; and the material description information is used to describe a content feature of a user material.

The first video editing template according to the embodiment of the present disclosure may be a video editing template carrying a preset edition operation. Specifically, a type of the editing operation carried by the first video editing template will not be limited in the embodiments of the present disclosure.

In the embodiment of the present disclosure, the material addition page is displayed in the case where the preset edition operation for the first video editing template is received. Wherein the preset edition operation may be any preset trigger operation, for example, a trigger operation on an editing control corresponding to the first video editing template.

In the embodiment of the present disclosure, the material description information corresponding to the first video editing template can be displayed on the material addition page; and a user may select a user material based on the content feature indicated by the material description information, so as to acquire the user material that meets the content feature indicated by the material description information.

Figure 2:
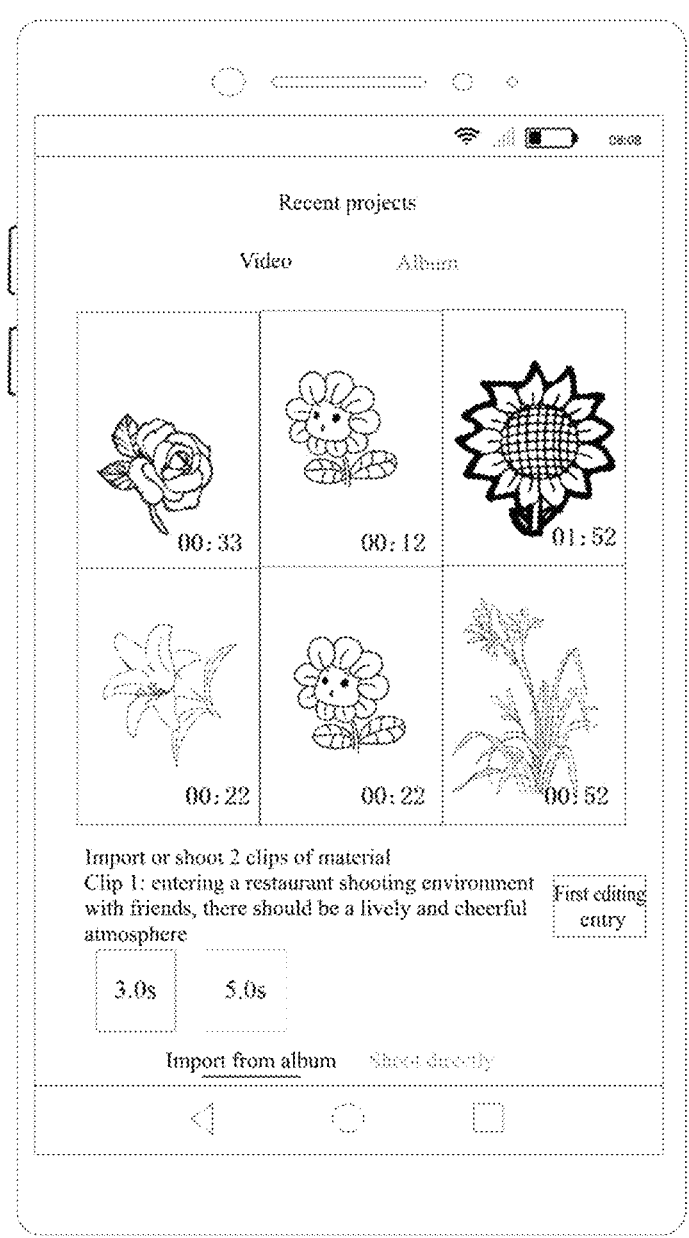
FIG. 2 is a schematic diagram of a material addition page provided by an embodiment of the present disclosure.

As shown in FIG. 2, which is a schematic diagram of a material addition page provided by an embodiment of the present disclosure, wherein material description information corresponding to the first video editing template is displayed on the material addition page; and the material description information has a linkage relationship with a video clip corresponding to the first video editing template. As shown in FIG. 2, the first video editing template corresponds to two video clips, one clip having a duration of 3.0 seconds and the other clip having a duration of 5.0 seconds. Specifically, the linkage relationship between the material description information and the video clip is reflected in that when a video clip with a duration of 3.0 seconds located in a first position on the material addition page is selected, the material description information corresponding to the video clip is displayed in a linked manner on the material addition page, to indicate selection of the user material corresponding to the video clip. In the case where a video clip with a duration of 5.0 seconds located in a second position on the material addition page is selected, the material description information corresponding to the video clip is displayed in a linked manner on the material addition page to indicate selection of the user material corresponding to the video clip.

In the embodiment of the present disclosure, the material description information is used to describe the content feature of the user material. For example, the material description information may be "entering a restaurant shooting environment with friends, there should be a lively and cheerful atmosphere", indicating that the user material corresponding to the material description information may be selected from user materials that meet the content features such as "restaurant", "lively and cheerful atmosphere", etc. as indicated by the material description information.

S102: acquiring the user material corresponding to the first video editing template, based on the material addition page.

In the embodiment of the present disclosure, the material addition page may include an album import page and/or a shooting page, as shown in FIG. 2 above. In practical applications, the user may select the user material that meets the content feature indicated by the material description information from the album import page, or may also capture the user material that meets the content feature indicated by the material description information based on the shooting page.

It is worth noting that the material description information according to the embodiment of the present disclosure is used for providing reference information for the user to select the user material. Specifically, the content feature of the user material corresponding to the acquired first video editing template will not be limited in the embodiments of the present disclosure.

In practical applications, the material description information corresponding to the first video editing template has a corresponding relationship with the video clip corresponding to the first video editing template. In the embodiment of the present disclosure, user materials respectively corresponding to one or more video clips in the video clip corresponding to the first video editing template may be acquired based on the material addition page.

S103: generating a first video corresponding to the first video editing template based on the user material.

Wherein the first video is a video edited from the user material according to an editing operation indicated by the first video editing template.

In the embodiment of the present disclosure, after acquiring the user material corresponding to the first video editing template, the first video corresponding to the first video editing template is generated according to the acquired user material.

In practical applications, the acquired user material may be edited according to the editing operation indicated by the first video editing template, to obtain the first video.

Specifically, the user materials having a corresponding relationship with the video clip may be edited according to the editing operation indicated by the video clip corresponding to the first video editing template, and then the edited user materials may be synthesized according to a sequential order of respective video clips, to obtain the first video.

In the video editing method provided by the embodiment of the present disclosure, the material addition page is firstly displayed, in the case where the preset edition operation for the first video editing template is received, wherein the material description information corresponding to the first video editing template is displayed on the material addition page and is used for describing the content feature of the user material. Then, based on the material addition page, the user material corresponding to the first video editing template is acquired for generating the first video corresponding to the first video editing template, wherein the first video is a video edited from the acquired user material according to an editing operation indicated by the first video editing template. It may be seen that in the embodiment of the present disclosure, the material description information in the first video editing template may be utilized to indicate acquisition of the user material, and then the first video is generated based on the acquired user material, which enriches the video editing modes and improves user experience.

On the basis of the above-described embodiments, in order that the user may have an overall understanding of the video content feature corresponding to the first video editing template, the description information page may be automatically pulled up and displayed in a preset direction on the material addition page, in the case where the material addition page is displayed in step S101 according to the above-described embodiment. Wherein the description information page is provided thereon with a material addition entry and displays the material description information corresponding to the first video editing template. In response to the trigger operation for the material addition entry on the description information page, it jumps from the description information page to the material addition page.

Figure 3:
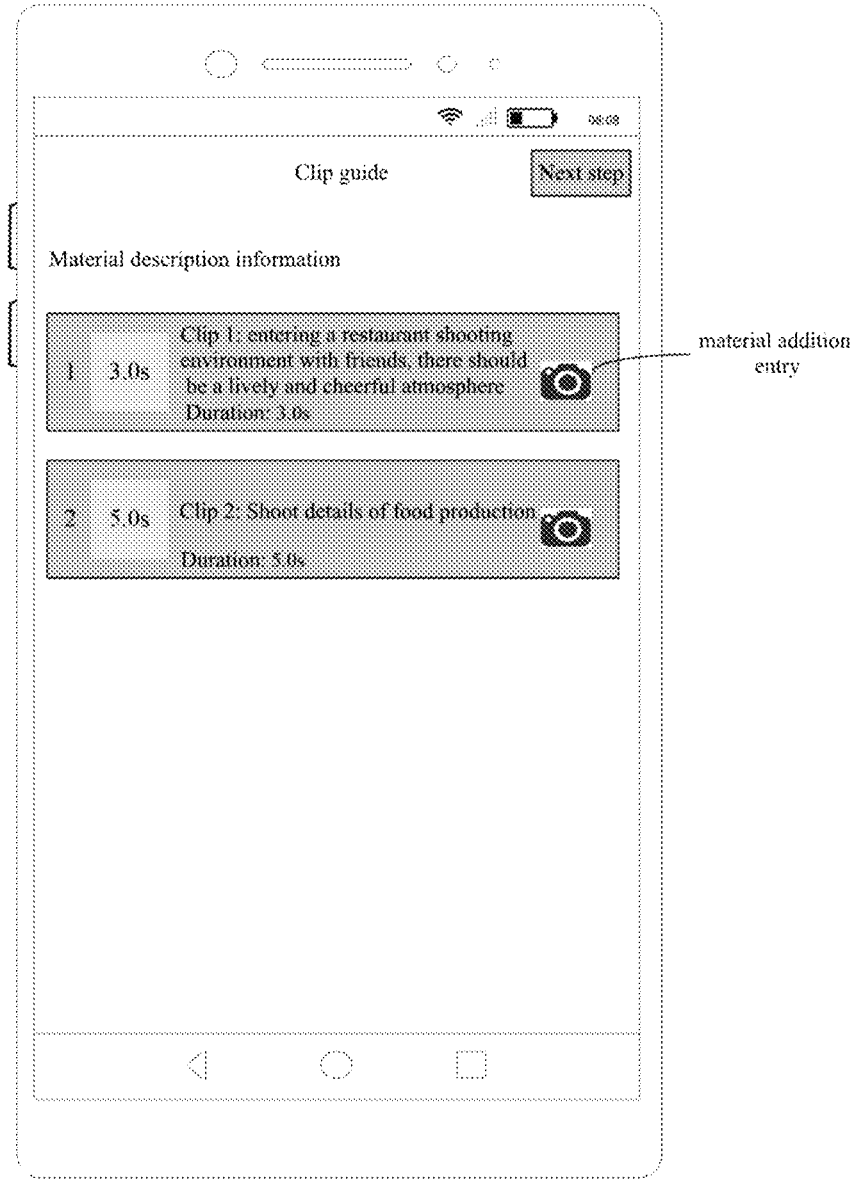
FIG. 3 is a schematic diagram of a description information page provided by an embodiment of the present disclosure.

As shown in FIG. 3, which is a schematic diagram of a description information page provided by an embodiment of the present disclosure, wherein the description information page displays thereon the material description information corresponding to the first video editing template, and duration requirements of the user material corresponding to each material description information. The user may have an overall understanding of all material description information corresponding to the first video editing template through the description information page, which facilitates subsequent selection of the user material.

In the embodiment of the present disclosure, the material addition entry may be set on the description information page.

In an optional implementation, a material addition entry may be set on the description information page, and be used for triggering entry into the material addition page, to implement acquisition of the user material.

In another optional implementation, as shown in FIG. 3, a material addition entry may be respectively set for each material description information on the description information page; in the case where a user has a material selection requirement for a certain piece of material description information, he/she may click on a material addition entry corresponding to the material description information to trigger entry into the material addition page. At this time, after entering the material addition page, a material selection position corresponding to the material description information on the material addition page is in a selected state.

Based on the above-described embodiments, an embodiment of the present disclosure further provides a video editing method, referring to FIG. 4, which is a flow chart of another video editing method provided by the embodiment of the present disclosure, the method including:

S401: displaying a material addition page in response to a preset edition operation for a second video obtained based on a first video editing template.

Wherein the first video editing template is used to indicate that a material to be edited is edited into the second video according to an editing operation indicated by the first video editing template.

In the embodiment of the present disclosure, the second video may be a video edited based on the first video editing template; specifically, the second video is obtained by editing the material to be edited according to the editing operation indicated by the first video editing template.

In the embodiment of the present disclosure, a first editing entry is set on the material addition page, as shown in FIG. 2 above. In the case where a trigger operation for the first editing entry is received, a description information page is displayed, wherein the description information page displays thereon the material description information and the material addition entry corresponding to the first video editing template, as shown in FIG. 3 above. In the case where a trigger operation for the material addition entry on the description information page is received, it jumps from the description information page to the material addition page for subsequent selection of the user material based on the material addition page.

The description information page according to the embodiment of the present disclosure is used to provide overall exhibition of the first video editing template and the video content feature corresponding to the second video for the user.

In an optional implementation, a second editing entry is displayed on the playing page of the second video in a case where the material description information is detected in the second video obtained based on the first video editing template, wherein the second video is sourced from a recommended video stream, and the second editing entry is used to trigger entry into the description information page.

In practical applications, when acquiring the second video based on the recommended video stream, it is firstly detected whether the second video carries the material description information. If YES, the second editing entry is displayed on the playing page of the second video. Referring to FIG. 5, which is a schematic diagram of a playing page of a second video provided by an embodiment of the present disclosure, wherein a second editing entry is displayed on the playing page. When receiving a trigger operation for the second editing entry, the description information page as shown in FIG. 3 above may be displayed, so that the user may know the video content feature corresponding to the second video.

S402: acquiring the user material corresponding to the first video editing template, based on the material addition page.

S402 according to the embodiment of the present disclosure may be understood by referring to the description of S102 according to the above-described embodiment, and no details will be repeated here.

S403: generating a first video corresponding to the first video editing template according to the user material, wherein the first video is a video edited from the user material according to an editing operation indicated by the first video editing template.

In an optional implementation, after acquiring the user material corresponding to the first video editing template based on the material addition page, it jumps to the description information page through a preset trigger operation, and the acquired user material is updated and displayed on the description information page. Through the description information page, the user may determine a user material acquisition situation of the material description information corresponding to the first video editing template.

In an optional implementation, a video generating control is set on the description information page, for example, the "Next" button as shown in FIG. 3 above; when receiving a trigger operation for the video generating control on the description information page, the acquired user material is edited into the first video according to the editing operation indicated by the first video editing template, so as to acquire the first video that belongs to videos having the same style as the second video.

In the video editing method provided by the embodiment of the present disclosure, the material addition page is displayed, when receiving the preset edition operation for the second video; the user material corresponding to the second video is acquired, based on the material addition page; and then, the first video that belongs to videos having the same style as the second video is acquired. It may be seen that in the embodiment of the present disclosure, on the basis of a function of editing videos of a same style, the material description information is displayed for the user, and indicates acquisition of the user material, which enriches video editing modes, and improves user experience.

On the basis of the above-described embodiments, the embodiment of the present disclosure further provides a video editing method, in which an edition template video of the second video according to the above-described embodiment may be generated, for providing a user with a video edition function, which enriches video editing modes, and improves user experience.

Specifically, referring to FIG. 6, which is a flow chart of another video editing method provided by an embodiment of the present disclosure, the method including:

S601: displaying a description information edition page, in response to a trigger operation for a material description information addition entry.

Wherein a cover of a replaceable material and a description information input box corresponding to the replaceable material are displayed on the material description edition page.

In the embodiment of the present disclosure, the material description information addition entry may be set on a playing page of a video to be edited that includes a plurality of replaceable materials, as shown in FIG. 7, which is a schematic diagram of a playing page of a video to be edited provided by an embodiment of the present disclosure, wherein a "script addition" entry may be set on the playing page of the video to be edited, and be taken as the material description information addition entry.

Figure 8:
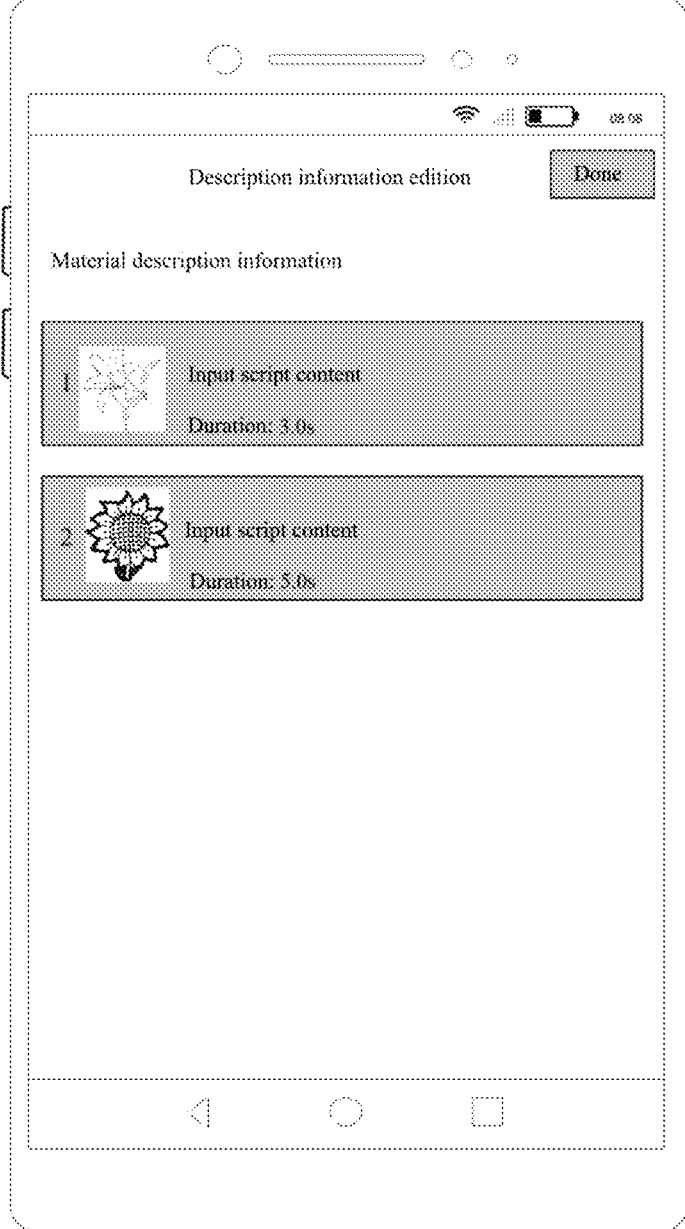
FIG. 8 is a schematic diagram of a description information edition page provided by an embodiment of the present disclosure.

In practical applications, the description information edition page is displayed when receiving a trigger operation for the material description information addition entry. As shown in FIG. 8, which is a schematic diagram of a description information edition page provided by an embodiment of the present disclosure, wherein the description information edition page displays thereon covers of respective replaceable materials and description information input boxes corresponding thereto, and the description information input box is used to receive material description information for a corresponding replaceable material.

S602: acquiring the material description information of the replaceable material corresponding to the description information input box, based on the description information input box on the description information edition page.

In the embodiment of the present disclosure, when receiving a trigger operation for any description information input box, material description information for a replaceable material corresponding thereto may be input in the description information input box.

In another optional implementation, in response to a trigger operation for a target cover in the cover of the replaceable material displayed on the description information edition page, the replaceable material corresponding to the target cover is played on the material preview page, and the description information input box of the replaceable material corresponding to the target cover is displayed on the material preview page. Then, based on the description information input box on the material preview page, the material description information of the replaceable material corresponding to the target cover is acquired.

Figures 9, 10:
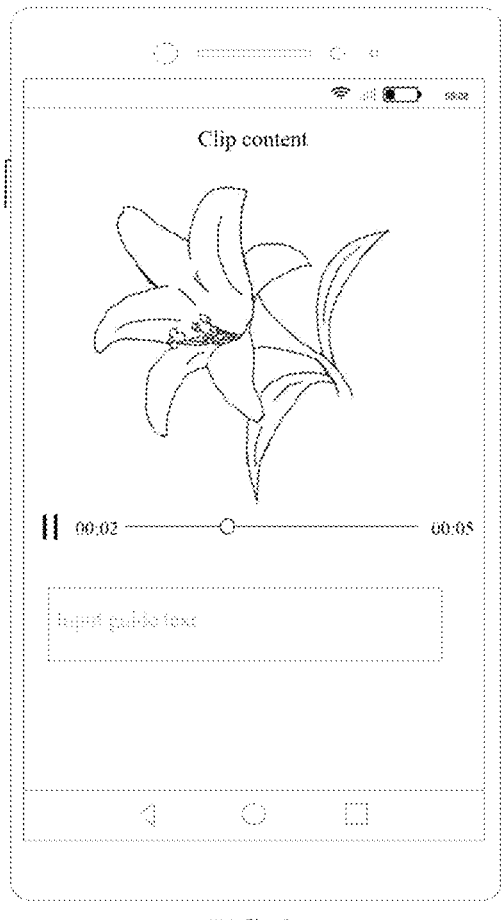
FIG. 9 is a schematic diagram of a material preview page provided by an embodiment of the present disclosure.
FIG. 10 is a structural schematic diagram of a video editing apparatus provided by an embodiment of the present disclosure.

As shown in FIG. 9, which is a schematic diagram of a material preview page provided by an embodiment of the present disclosure, wherein the replaceable material corresponding to the target cover is played in an upper region of the material preview page, and the description information input box is displayed in a lower region of the material preview page. The user may implement an addition function for the material description information of the replaceable material by inputting the material description information into the description information input box.

In an optional implementation, different replaceable materials may have a same editing indication identifier; and replaceable materials having a same editing indication identifier may be added with same material description information. Therefore, in the embodiment of the present disclosure, after acquiring material description information of any replaceable material, the material description information is synchronized with material description information of a replaceable material having a same editing indication identifier, thereby improving efficiency of adding material description information.

S603: generating an edition template video, based on the material description information corresponding to the replaceable material.

In the embodiment of the present disclosure, after acquiring the material description information corresponding to the replaceable materials respectively, an edition template video is generated based on the material description information.

In an optional implementation, a "Complete" button is set on the description information edition page, as shown in FIG. 8 above; when receiving a trigger operation for the "Complete" button, it is firstly determined whether all replaceable materials on the description information edition page have completed addition of material description information. If YES, an edition template video is generated based on the material description information corresponding to the respective replaceable materials; if there are some replaceable materials that have not completed addition of material description information, the user is indicated to continue to complete addition of material description information for all replaceable materials.

In the video editing method provided by the embodiment of the present disclosure, the video editing template with material description information may be generated by adding the material description information; the video editing template may be used to provide the user with functions of acquiring the user material and generating the video based on the indication of the material description information. The embodiment of the present disclosure enriches video editing modes and improves user experience.

Based on a same inventive concept as the above-described method embodiment, an embodiment of the present disclosure further provides a video editing apparatus, referring to FIG. 10, which is a structural schematic diagram of a video editing apparatus provided by an embodiment of the present disclosure. The apparatus includes the first displaying module 1001, the first acquiring module 1002, and the first generating module 1003.

The first displaying module 1001 is configured to display a material addition page in response to a preset edition operation for a first video editing template, wherein material description information corresponding to the first video editing template is displayed on the material addition page, and the material description information is used to describe a content feature of a user material.

The first acquiring module 1002 is configured to acquire a user material corresponding to the first video editing template, based on the material addition page.

The first generating module 1003 is configured to generate a first video corresponding to the first video editing template according to the user material, wherein the first video is a video edited from the user material according to an editing operation indicated by the first video editing template.

In an optional implementation, the first displaying module is specifically configured to:

Display the material addition page, in response to a preset edition operation for a second video obtained based on the first video editing template, wherein the first video editing template is used to indicate that the material to be edited is edited into the second video according to the editing operation indicated by the first video editing template.

In an optional implementation, a first editing entry is set on the material addition page, and the apparatus further includes:

A second displaying module, configured to display a description information page, in response to a trigger operation for the first editing entry, wherein the material description information and a material addition entry corresponding to the first video editing template are displayed on the description information page;

A first jumping module, configured to jump from the description information page to the material addition page, in response to the trigger operation for the material addition entry on the description information page.

In an optional implementation, a video generating control is set on the description information page, and the first generating module is specifically configured to:

Editing the user material into a first video according to the editing operation indicated by the first video editing template, in response to the trigger operation for the video generating control on the description information page.

In an optional implementation, the apparatus further includes:

A third displaying module, configured to display a second editing entry on the playing page of the second video in a case where the material description information is detected in the second video obtained based on the first video editing template, wherein the second video is sourced from a recommended video stream, and the second editing entry is used to trigger entry into the description information page.

In an optional implementation, the apparatus further includes:

A fourth displaying module, configured to pull up and display the description information page in a preset direction on the material addition page, wherein a material addition entry is set on the description information page;

A second jumping module, configured to jump from the description information page to the material addition page, in response to a trigger operation for the material addition entry on the description information page.

In an optional implementation, the apparatus further includes:

A fifth displaying module, configured to display a description information edition page, in response to a trigger operation for a material description information addition entry, wherein a cover of a replaceable material and a description information input box corresponding to the replaceable material are displayed on the material description edition page;

A second acquiring module, configured to acquire the material description information of the replaceable material corresponding to the description information input box, based on the description information input box on the description information edition page;

A first generating module, configured to generate an edition template video, based on the material description information corresponding to the replaceable material.

In an optional implementation, the apparatus further includes:

A sixth displaying module, configured to play the replaceable material corresponding to a target cover on the material preview page, and display the description information input box of the replaceable material corresponding to the target cover on the material preview page, in response to the trigger operation for the target cover in the cover of the replaceable material displayed on the description information edition page;

A third acquiring module, configured to acquire the material description information of the replaceable material corresponding to the target cover, based on the description information input box on the material preview page.

In an optional implementation, the apparatus further includes:

A synchronizing module, configured to synchronize the material description information as material description information of a replaceable material having a same editing indication identifier as the replaceable material, after acquiring material description information of any replaceable material.

In addition to the method and the apparatus as described above, an embodiment of the present disclosure further provides a computer readable storage medium, having instructions stored therein, wherein the instructions, when running on a terminal device, cause the terminal device to implement the video editing method according to the embodiment of the present disclosure.

An embodiment of the present disclosure further provides a computer program product, including a computer program/instruction, wherein the computer program/instruction, when executed by a processor, implements the video editing method according to the embodiment of the present disclosure.

Figure 11:
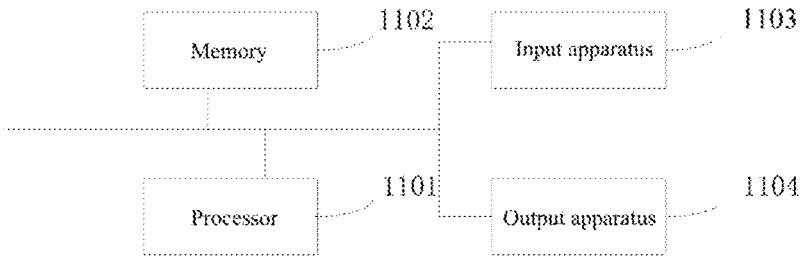
FIG. 11 is a structural schematic diagram of a video editing device provided by an embodiment of the present disclosure.

In addition, an embodiment of the present disclosure further provides a video editing device, referring to FIG. 11, which may include:

A processor 1101, a memory 1102, an input apparatus 1103, and an output apparatus 1104. The number of processors 1101 in the video editing device may be one or more, FIG. 11 is shown by taking one processor as an example. In some embodiments of the present disclosure, the processor 1101, the memory 1102, the input apparatus 1103, and the output apparatus 1104 may be connected through a bus or other means, wherein FIG. 11 is shown by taking bus connection as an example.

The memory 1102 may be configured to store software programs and modules; and the processor 1101 executes various functional applications of the video editing device and data processing by running the software programs and the modules stored in the memory 1102. The memory 1102 may mainly include a program storage region and a data storage region, wherein the program storage region may store an operating system, an application required for at least one function, etc. In addition, the memory 1102 may include a high-speed random access memory, and may also include a nonvolatile memory, for example, at least one disk storage device, a flash memory, or other volatile solid-state storage device. The input apparatus 1103 may be configured to receive input digital or character information, and generate signal inputs related to user settings and function control of the video editing device.

Specifically, in this embodiment, the processor 1101 will load executable files corresponding to the processes of one or more applications into the memory 1102 according to instructions below, and the processor 1101 will run the applications stored in the memory 1102, so as to implement various functions of the video editing device as described above.

It should be noted that, relational terms herein such as "first" and "second" are only used to distinguish one entity or operation from another entity or operation, and do not necessarily require or imply any actual relationship or order between these entities or operations. In addition, the terms "include", "comprise", or their any other variants are intended to cover a non-exclusive inclusion, so that a process, a method, a product or a device that includes a list of elements not only includes those elements but also includes other elements that are not expressly listed, or further includes elements inherent to such process, method, product or device. Without more constraints, the elements limited by the statement "including one . . . " does not exclude that there is another same or identical element in the process, method, product, or device that includes the element.

The above is only the specific implementation provided to enable those skilled in the art to understand and practice the present disclosure. Various modifications to these embodiments will be readily apparent to those skilled in the art, and the generic principles defined herein may be applied to other embodiments without departing from the spirit or scope of the present disclosure. Therefore, the present disclosure will not be limited to these embodiments described herein, but is to be accorded the widest scope consistent with the principles and novel features disclosed herein.

The invention claimed is:

1. A video editing method, comprising:
   displaying a material addition page, in response to a preset editing operation for a first video editing template, wherein material description information corresponding to the first video editing template is displayed on the material addition page, and the material description information is used to describe a content feature of a user material;
   acquiring a user material corresponding to the first video editing template, based on the material addition page; and
   generating a first video corresponding to the first video editing template according to the user material, wherein the first video is a video edited from the user material according to an editing operation indicated by the first video editing template,
   wherein displaying the material addition page, in response to the preset editing operation for the first video editing template, comprises:
      displaying the material addition page, in response to a preset editing operation for a second video obtained based on the first video editing template, wherein the first video editing template is used to indicate that a material to be edited is edited into the second video according to the editing operation indicated by the first video editing template,
   wherein the second video is an existing video which was obtained by editing based on the editing operation indicated by the first video editing template,
   wherein the first video is generated to have a same style as the second video,
   wherein the material description information has a linkage relationship with video clips corresponding to the first video editing template,
   in response to selection of a video clip from among the video clips, the material description information corresponding to the selected video clip is displayed in a linked manner on the material addition page, and the material description information corresponding to unselected video clips is not displayed on the material addition page, and
   the material addition page further displays durations of the video clips corresponding to the first video editing template.

2. The method according to claim 1, wherein a first editing entry is provided on the material addition page, and before the acquiring a user material corresponding to the first video editing template, based on the material addition page, the method further comprises:
   displaying a description information page, in response to a trigger operation for the first editing entry, wherein a material addition entry and the material description information corresponding to the first video editing template are displayed on the description information page; and
   jumping from the description information page to the material addition page, in response to a trigger operation for the material addition entry on the description information page.

3. The method according to claim 2, wherein a video generating control is provided on the description information page, and the generating a first video corresponding to the first video editing template according to the user material, comprises:

editing the user material into the first video according to the editing operation indicated by the first video editing template, in response to a trigger operation for the video generating control on the description information page.

4. The method according to claim 1, wherein, before displaying the material addition page, in response to the preset editing operation for the second video obtained based on the first video editing template, the method further comprises:

displaying a second editing entry on a playing page of the second video in a case where the material description information is detected in the second video obtained based on the first video editing template, wherein the second video is sourced from a recommended video stream, and the second editing entry is used to trigger an entry into a description information page.

5. The method according to claim 1, wherein, before acquiring a user material corresponding to the first video editing template, based on the material addition page, the method further comprises:

pulling up in a preset direction and displaying a description information page on the material addition page, wherein a material addition entry is provided on the description information page; and jumping from the description information page to the material addition page, in response to a trigger operation for the material addition entry on the description information page.

6. The method according to claim 1, further comprising:

displaying a description information editing page, in response to a trigger operation for a material description information addition entry, wherein a cover of a replaceable material and a description information input box corresponding to the replaceable material are displayed on the description information editing page;

acquiring material description information of the replaceable material corresponding to the description information input box, based on the description information input box on the description information editing page; and generating an editing template video, based on the material description information corresponding to the replaceable material, wherein the description information editing page is used for editing the material description information, the material description information addition entry is a component for triggering displaying the description information editing page, and the material description information addition entry is set on a playing page of a video to be edited that comprises a plurality of replaceable materials.

7. The method according to claim 6, wherein, before the generating an editing template video, based on the material description information corresponding to the replaceable material, the method further comprises:

playing a replaceable material corresponding to a target cover on a material preview page, and displaying a description information input box for the replaceable material corresponding to the target cover on the material preview page, in response to a trigger operation for the target cover in the cover of the replaceable material displayed on the description information editing page; and

acquiring the material description information of the replaceable material corresponding to the target cover, based on the description information input box on the material preview page.

8. The method according to claim 6, further comprising:

after acquiring material description information of a replaceable material, synchronizing the material description information as material description information of a replaceable material having a same editing indication identifier as an editing indication identifier of the replaceable material.

9. The method according to claim 1, wherein the material description information corresponding to the first video editing template has a corresponding relationship with the video clips corresponding to the first video editing template, and the acquiring a user material corresponding to the first video editing template, based on the material addition page, comprises:

acquiring user materials respectively corresponding to one or more video clips in the video clips corresponding to the first video editing template, based on the material addition page.

10. The method according to claim 9, wherein the generating a first video corresponding to the first video editing template according to the user material, comprises:

editing user materials having corresponding relationships, respectively, with the video clips, according to an editing operation indicated by the video clips corresponding to the first video editing template; and synthesizing the user materials after being edited according to a sequential order of respective video clips, to obtain the first video.

11. The method according to claim 5, wherein, after the acquiring a user material corresponding to the first video editing template, based on the material addition page, the method further comprises:

jumping to the description information page, and updating and displaying an acquired user material on the description information page, in response to the trigger operation.

12. A video editing apparatus, comprising:

a processor configured to execute:

a first displaying module, configured to display a material addition page, in response to a preset editing operation for a first video editing template, wherein material description information corresponding to the first video editing template is displayed on the material addition page, and the material description information is used to describe a content feature of a user material;

a first acquiring module, configured to acquire a user material corresponding to the first video editing template, based on the material addition page; and a first generating module, configured to generate a first video corresponding to the first video editing template according to the user material, wherein the first video is a video edited from the user material according to an editing operation indicated by the first video editing template, wherein the first displaying module is further configured to:

display the material addition page, in response to a preset editing operation for a second video obtained based on the first video editing template, wherein the first video editing template is used to indicate that a material to be edited is edited into the second video according to the editing operation indicated by the first video editing template, wherein the second video is an existing video which was obtained by editing based on the editing operation indicated by the first video editing template, wherein the first video is generated to have a same style as the second video, wherein the material description information has a linkage relationship with video clips corresponding to the first video editing template, in response to selection of a video clip from among the video clips, the material description information corresponding to the selected video clip is displayed in a linked manner on the material addition page, and the material description information corresponding to unselected video clips is not displayed on the material addition page, and the material addition page further displays durations of the video clips corresponding to the first video editing template.

13. The apparatus of claim 12, wherein a first editing entry is provided on the material addition page, and the processor further executes:

a second displaying module, configured to display a description information page, in response to a trigger operation for the first editing entry, wherein a material addition entry and the material description information corresponding to the first video editing template are displayed on the description information page; and a first jumping module, configured to jump from the description information page to the material addition page, in response to a trigger operation for the material addition entry on the description information page.

14. The apparatus of claim 13, wherein a video generating control is provided on the description information page, and the first generating module is further configured to:

edit the user material into the first video according to the editing operation indicated by the first video editing template, in response to a trigger operation for the video generating control on the description information page.

15. The apparatus of claim 12, wherein the processor further executes:

a third displaying module, configured to display a second editing entry on a playing page of the second video in a case where the material description information is detected in the second video obtained based on the first video editing template, wherein the second video is sourced from a recommended video stream, and the second editing entry is used to trigger an entry into a description information page.

16. A non-transitory computer readable storage medium, on which instructions are stored, wherein the instructions, when executed on a terminal device, cause the terminal device to implement the method according to claim 1.

17. A device, comprising:

a memory, a processor, and a computer program stored on the memory and executable on the processor, wherein the processor, when executing the computer program, implements the method according to claim 1.

* * * * *